(12) United States Patent
Williams

(10) Patent No.: US 7,258,523 B2
(45) Date of Patent: Aug. 21, 2007

(54) MEANS TO REGULATE WATER VELOCITY THROUGH A HYDRO ELECTRIC TURBINE

(75) Inventor: Herbert L. Williams, East Palatka, FL (US)

(73) Assignee: OpenHydro Group Limited, Dublin (IE)

(*) Notice: Subject to any disclaimer, the term of this patent is extended or adjusted under 35 U.S.C. 154(b) by 122 days.

(21) Appl. No.: 10/852,481

(22) Filed: May 25, 2004

(65) Prior Publication Data

US 2005/0265820 A1    Dec. 1, 2005

Related U.S. Application Data

(60) Provisional application No. 60/472,092, filed on May 21, 2003.

(51) Int. Cl.
*F03B 15/06* (2006.01)

(52) U.S. Cl. .................... 415/2.1; 415/3.1; 415/4.3; 415/7; 415/906

(58) Field of Classification Search ............. 415/2.1, 415/3.1, 4.3, 4.5, 7, 151, 156, 906, 173.2, 415/173.3, 1; 416/85, 86
See application file for complete search history.

(56) References Cited

U.S. PATENT DOCUMENTS

| | | | | |
|---|---|---|---|---|
| 2,054,142 | A * | 9/1936 | Sharp | 415/129 |
| 3,168,870 | A * | 2/1965 | Hornschuch | 415/156 |
| 3,618,699 | A * | 11/1971 | Evans et al. | 415/156 |
| 3,760,779 | A * | 9/1973 | MacLennan | 415/156 |
| 4,868,408 | A * | 9/1989 | Hesh | 415/3.1 |
| 6,409,466 | B1 * | 6/2002 | Lamont | 415/3.1 |

\* cited by examiner

*Primary Examiner*—Igor Kershteyn
(74) *Attorney, Agent, or Firm*—Thomas C. Saitta

(57) ABSTRACT

A hydro electric turbine having a flexible, collapsible front shroud, the upstream open end of the front shroud being controlled by a draw line passing through purse rings, whereby the upstream end can be closed by drawing on the draw line, thereby stopping water flow through the turbine. Decreased drag allows the turbine to rise to the surface. Opening the upstream end so that water flows into the turbine increases drag to lower the turbine into the water and causes rotation of the turbine blades.

9 Claims, 2 Drawing Sheets

MEANS TO REGULATE WATER VELOCITY THROUGH A HYDRO ELECTRIC TURBINE

CROSS-REFERENCE TO RELATED APPLICATIONS

This patent application claims priority from the provisional application No. 60/472,092 with the filing date May 21, 2003, titled, "Means to Increase Water Velocity through a Hydro Electric Turbine."

STATEMENT REGARDING FEDERALLY SPONSORED RESEARCH ORR DEVELOPMENT

"Not Applicable"

REFERENCE TO A MICROFICHE APPENDIX

"Not Applicable"

BACKGROUND OF THE INVENTION

The method of using a venturi to increase the velocity of a water flow is old. The embodiment has the following aspects which the inventor believes are new.
1) The front shroud is flexible (collapsible) on demand.
2) The front shroud can be pursed (drawn) together to stop water from flowing through it and the turbine.
3) The purse line can be released to allow water to flow through the front shroud and turbine.
4) A combination of a flexible front and a rigid rear shroud used together as one unit.
5) The method of pursing a flexible shroud to stop the rotation of a turbine.
6) The method of using a flotation chamber to raise a turbine to the surface to be serviced.

One of the problems inherent in a low head (run of the river, tidal, etc.) turbine for producing electricity is the relatively slow water velocity; usually from 1 to 5 knots. This device that incorporates two shrouds (one front, one rear) increases the water velocity flowing through the turbine.

This ability to increase low head water velocities to those of high head applications has inherent advantages of cost, size, efficiency and overall maintainability. Since horsepower output is on an exponential curve with water velocity, it is expedient to keep the blade diameter as small as possible to reach the goal power output. This embodiment does that by the use of shrouds. Overall cost per kilowatt hour is lower when shrouds are used since the shrouds are the least expensive component of the machine.

The collapsible front shroud, when pursed, provides a rapid means of shutting down the turbine.

SUMMARY OF THE INVENTION

The invention is in general a hydro electric turbine comprising a flexible, collapsible front shroud, wherein the front shroud can be readily collapsed to preclude water flow through the turbine. The upstream end of the front shroud is provided with purse rings and a draw line passing through the purse lines, such that when the draw string is pulled, the open forward end of the shroud is closed on itself. Release of the draw line allows water to enter the shroud and the turbine, commencing rotation of the turbine blades. The invention also comprises the method of using such a flexible, collapsible front shroud to increase water velocity through the turbine, to stop and start the rotation of the turbine, to reduce drag on the turbine such that it will rise to the surface, and to lower the turbine deeper in the water.

DETAILED DESCRIPTION OF THE INVENTION

Figure 1:
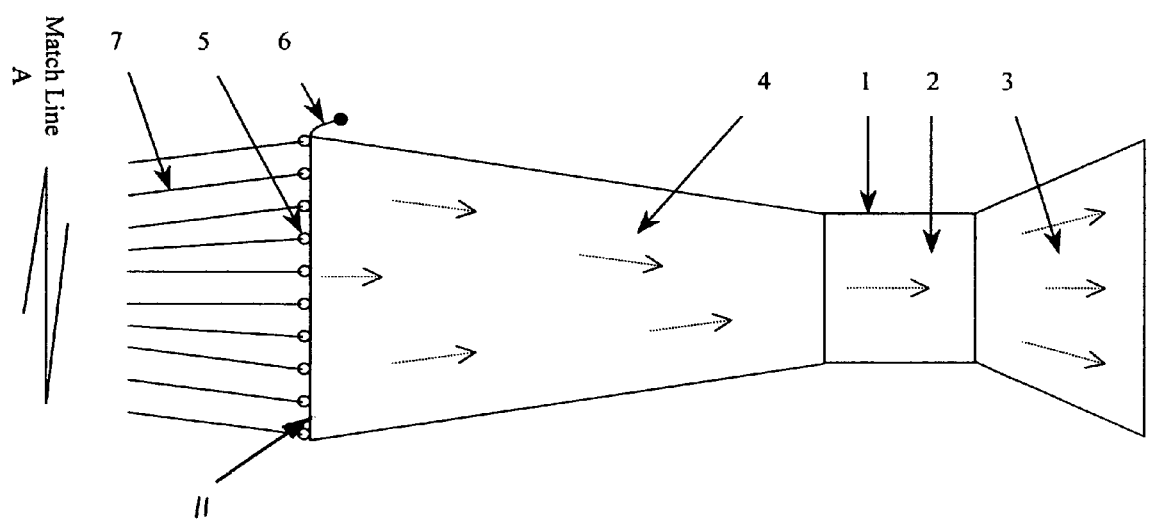
FIG. 1 shows the front and rear shroud with the turbine section between. The cables to the flotation chamber are cut at match line (A).
Figure 2:
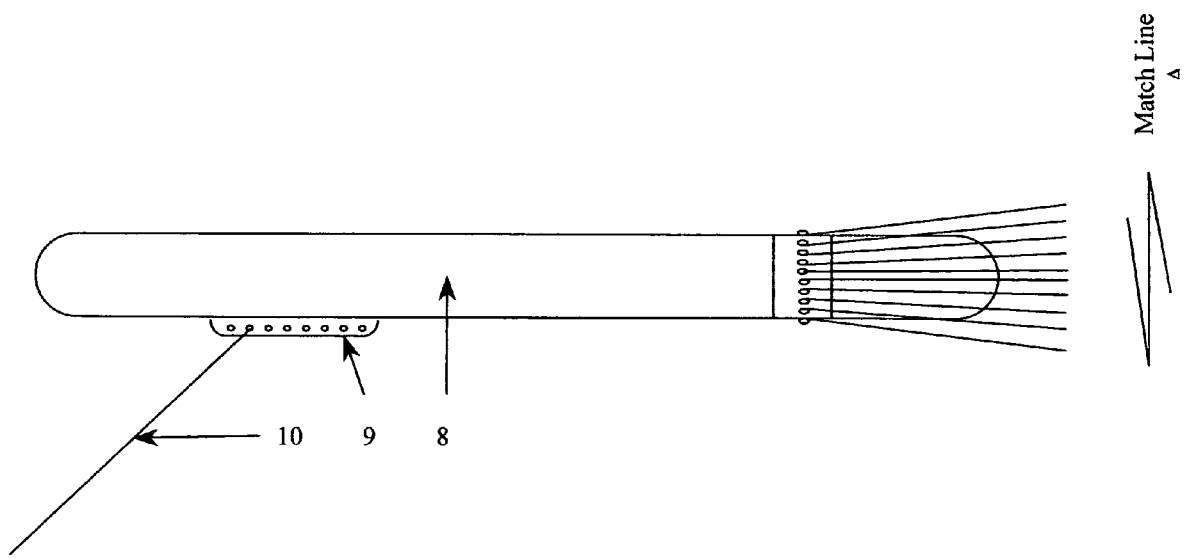
FIG. 2 shows the flotation chamber with anchor line. The cables to the shroud are cut at match line (A).

With reference to the drawings, the invention will now be described in detail with regard for the best mode and the preferred embodiment. The invention is both a device and a method of manipulating and operating the device. In general, the device is a hydro electric turbine having a flexible, collapsible front shroud.

As shown in the figures, the invention is a hydro electric turbine comprising a turbine housing (1), a rear shroud (3) and a flexible, collapsible front shroud (4). The turbine is secured in position within the flowing water by cables (7) connected to the open upstream end (11) of the front shroud (4), the cables (7) also connected to a flotation chamber (8), to which is connected an anchor line (10) at a scope angle adjustment member (9). A draw line (6) comprises a means to open and close the upstream end (11) of the front shroud (4) and is disposed about the upstream end (11) of the front shroud (4) by passing it through a plurality of purse rings (5).

As the water flows through front shroud (4), it's velocity and pressure increases. When the flow enters turbine housing (1), it has reached maximum velocity and pressure. It is in the area (2) that the work is being done of rotating the turbine blades. As the water passes through the rear shroud (3), its velocity and pressure is decreased continually until it merges again with the outside flow.

The draw line (6) which passes through all the purse rings (5) and is attached at one end to the front of the shroud (4) has the ability when pulled, to purse (draw together) the purse rings (5) and stop the water flow through the turbine. When the draw line (6) is released, the shroud (4) will again open, allowing water to pass through the turbine. The cable (7) attaches the front shroud (4) to the flotation chamber (8).

The scope angle adjustment member (9) is where the anchor line (10) is attached to the flotation chamber (8). By adjusting the attachment point of the anchor line (1) fore or aft, the scope angle can be altered in order to maintain the turbine in a horizontal position.

The embodiment is designed to be pulled below the water surface by the increased amount of drag created when the turbine is operating. When the turbine is switched off or the front shroud (4) is pursed, drag will decrease and the entire embodiment will float to the surface of the water body.

Control of the turbine as described above is accomplished by manipulating the draw line (6). With the turbine operational, the draw line (6) is pulled to purse and close the upstream end (11) of the front shroud (4), thereby blocking water flow into the turbine and causing the blades to stop rotating. The closing of the upstream end (11) of the front shroud (4) also reduces drag and causes the turbine to rise to the surface of the water. Relaxing or releasing the draw line (6) allows the upstream end (11) of the front shroud (4) to open, thereby allowing water into the turbine, causing the turbine to be pulled below the surface of the water by the increased drag on the anchor line (10) and initiating rotation of the turbine blades.

It is understood that equivalents and substitutions for certain elements set forth above may be obvious to those skilled in the art, and therefore the true scope and definition of the invention is to be as set forth in the following claims.

The invention claimed is:

1. A hydroelectric turbine comprising turbine housing and a flexible and collapsible front shroud extending upstream from said turbine housing, said front shroud having an upstream end disposed upstream of said turbine housing which defines an opening through which water flows, whereby said upstream end of said front shroud can be brought together upon itself to preclude water flow through said turbine.

2. The turbine of claim 1, further comprising a plurality of purse rings mounted upon said upstream end of said front shroud and a draw line passing through said purse rings, such that pulling said draw line through said purse rings closes said upstream end of said front shroud.

3. A method of stopping and starting the rotation of a hydroelectric turbine comprising a turbine housing, comprising the steps of:
   providing a flexible, collapsible front shroud on the upstream side of said turbine housing, said front shroud extending upstream of said turbine housing and having an upstream end, and means to open said upstream end of said front shroud and to close said upstream end of said front shroud upon itself;
   closing said upstream end to preclude water flow through said front shroud by bringing together said upstream end of said front shroud upon itself, thereby stopping rotation of said turbine; and
   opening said upstream end of said front shroud to allow water flow through said front shroud and into said turbine, thereby starting rotation of said turbine.

4. The method of claim 3, wherein said step of providing means to open and close said upstream end comprises providing purse rings mounted on said upstream end and a draw line passing through said purse rings;
   and further comprising the steps of pulling said draw line to close said upstream end of said front shroud; and
   releasing said draw line to open said upstream end of said front shroud.

5. A method of using purse rings and a draw line to stop and start the rotation of a hydroelectric turbine blade.

6. A method of reducing and increasing the drag on a hydroelectric turbine comprising a turbine housing, comprising the steps of:
   providing a flexible, collapsible front shroud on the upstream side of said turbine housing, said front shroud extending upstream of said turbine housing and having an upstream end, and means to open said upstream end of said front shroud and to close said upstream end of said front shroud upon itself;
   closing said upstream end of said front shroud to preclude water flow through said front shroud by bringing together said upstream end upon itself, thereby reducing drag on said turbine; and
   opening said upstream end of said front shroud to allow water flow through said front shroud and into said turbine, thereby increasing drag on said turbine.

7. The method of claim 6, wherein said step of providing means to open and close said upstream end comprises providing purse rings mounted on said upstream end and a draw line passing through said purse rings;
   further comprising the steps of pulling said draw line to close said upstream end of said front shroud; and
   releasing said draw line to open said upstream end of said front shroud.

8. A method of raising and lowering a hydroelectric turbine within a body of water comprising the steps of:
   providing a flexible, collapsible front shroud on the hydroelectric turbine, said front shroud having an open upstream end, and means to open and close said upstream end;
   raising said turbine by closing said upstream end to preclude water flow through said turbine, thereby reducing drag on said turbine; and
   lowering said turbine by opening said upstream end to allow water flow into said turbine, thereby increasing drag on said turbine.

9. The method of claim 8, wherein said step of providing means to open and close said upstream end comprises providing purse rings mounted on said upstream end and a draw line passing through said purse rings;
   and further comprising the steps of pulling said draw line to close said upstream end of said front shroud; and
   releasing said draw line to open said upstream end of said front shroud.

* * * * *